J. R. GAMMETER.
METHOD OF MAKING TIRES.
APPLICATION FILED FEB. 7, 1914.
1,183,553.
Patented May 16, 1916.
7 SHEETS—SHEET 2.
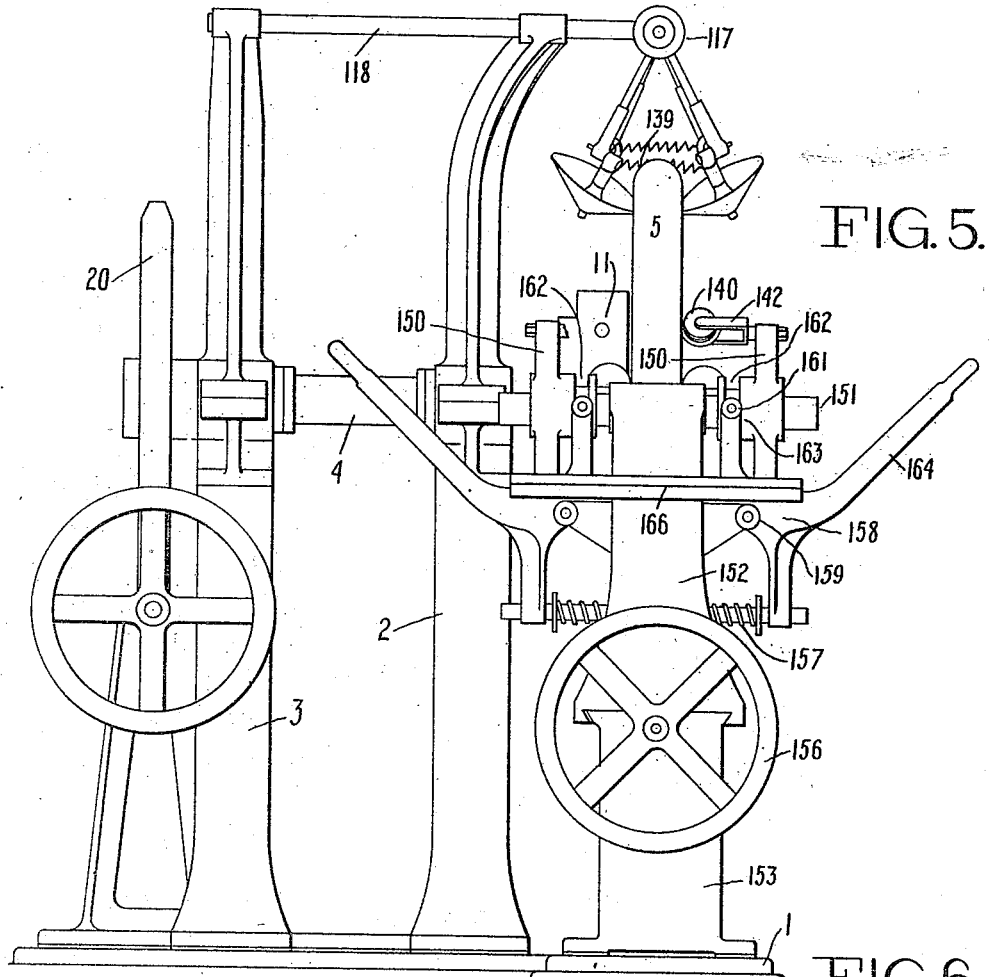
FIG. 5.
FIG. 6.
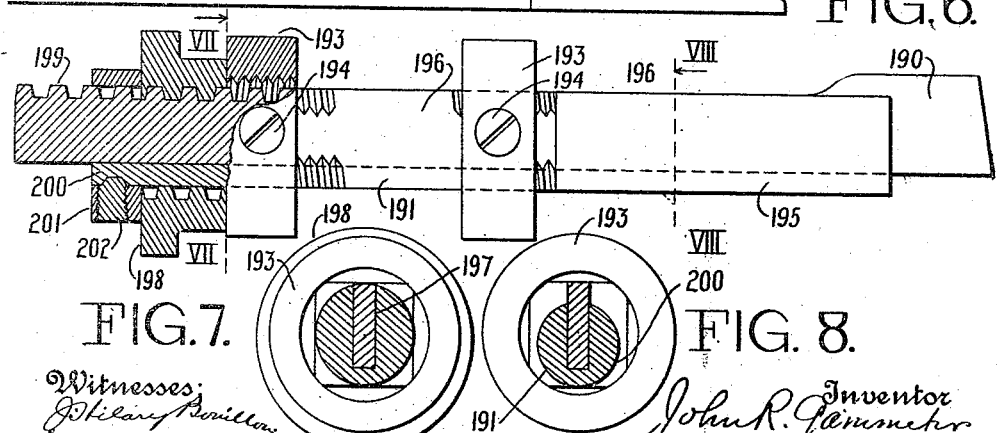
FIG. 7.   FIG. 8.

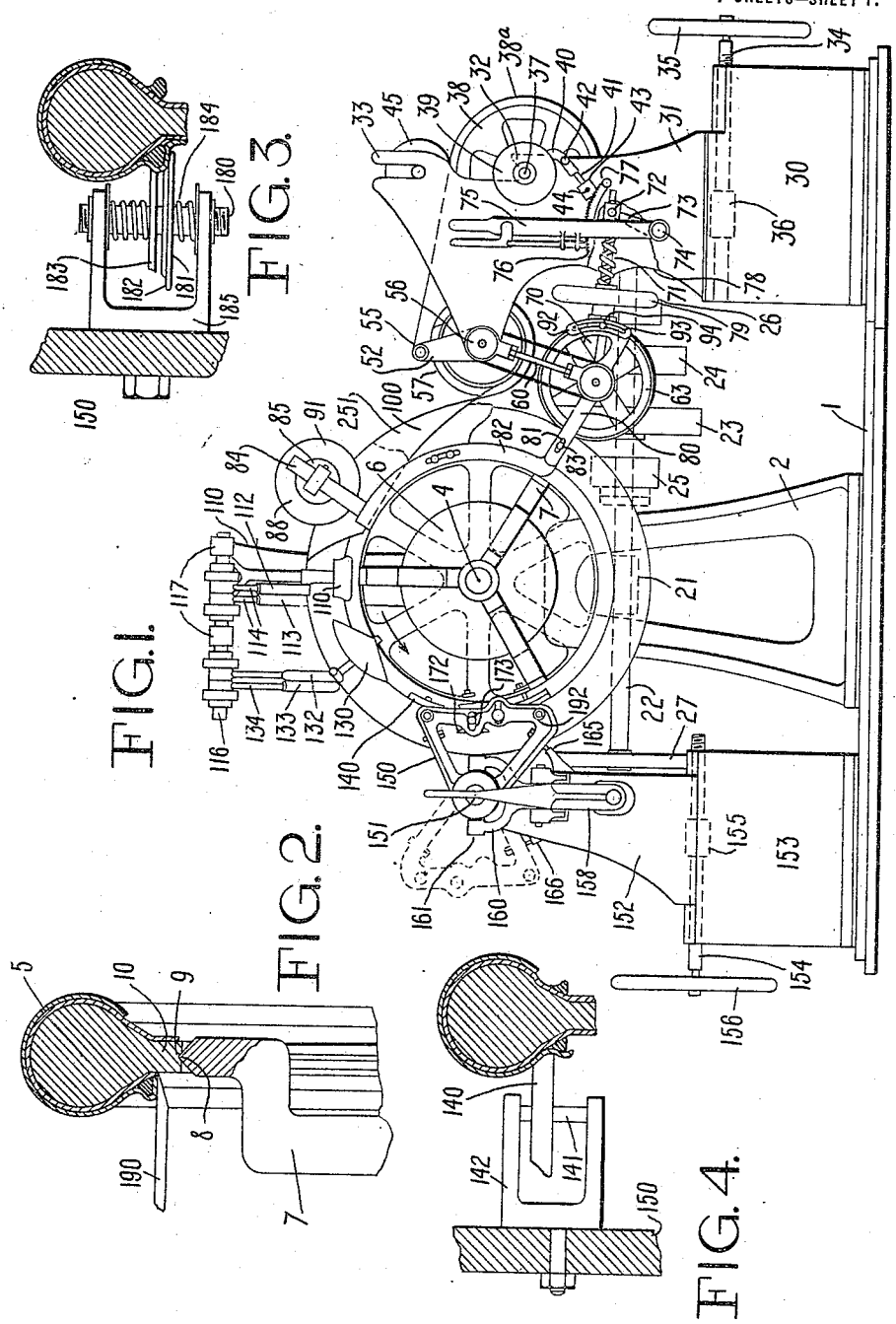

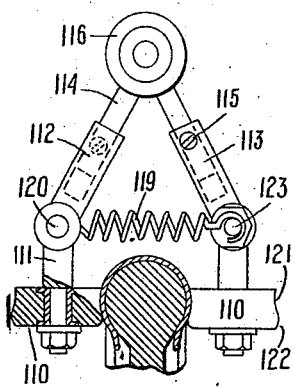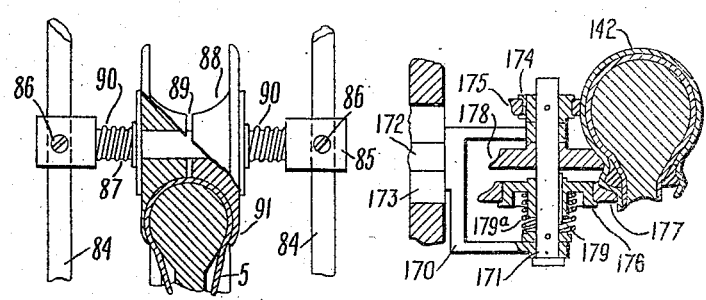
FIG. 9. FIG. 10. FIG. 11.
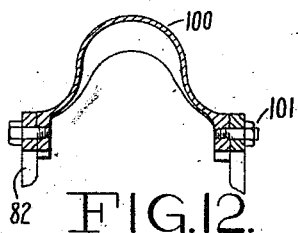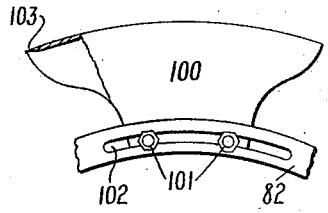
FIG. 12. FIG. 13.
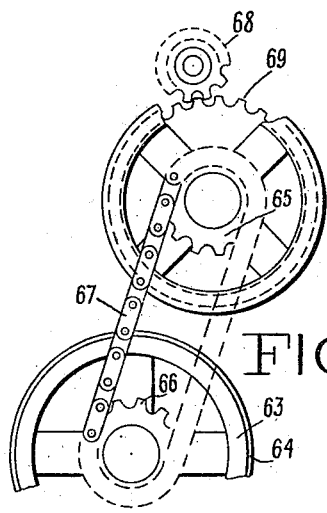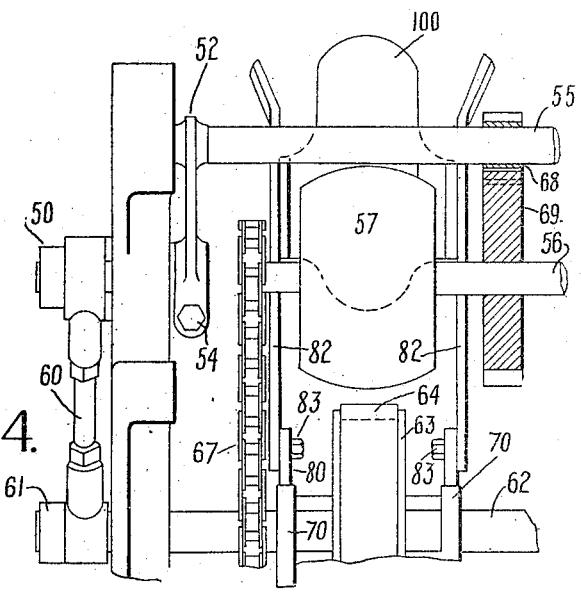
FIG. 14. FIG. 15.

J. R. GAMMETER.
METHOD OF MAKING TIRES.
APPLICATION FILED FEB. 7, 1914.
1,183,553.
Patented May 16, 1916.
7 SHEETS—SHEET 5.
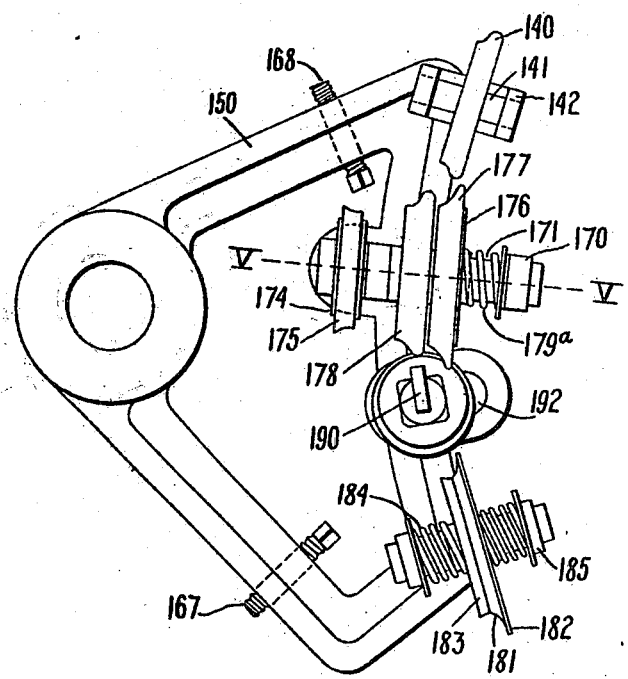 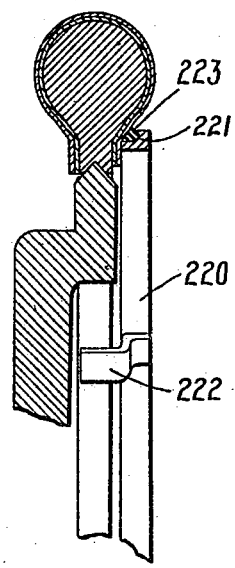
FIG. 17.   FIG. 18.
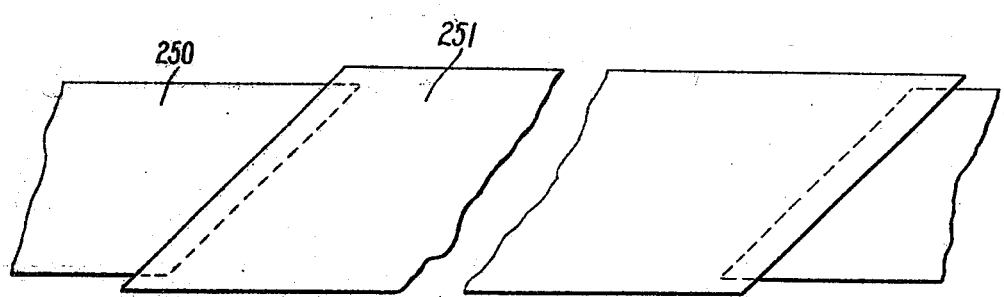
FIG. 19.
Witnesses:   John R. Gammeter  Inventor
  By his Attorney
  Seward Davis

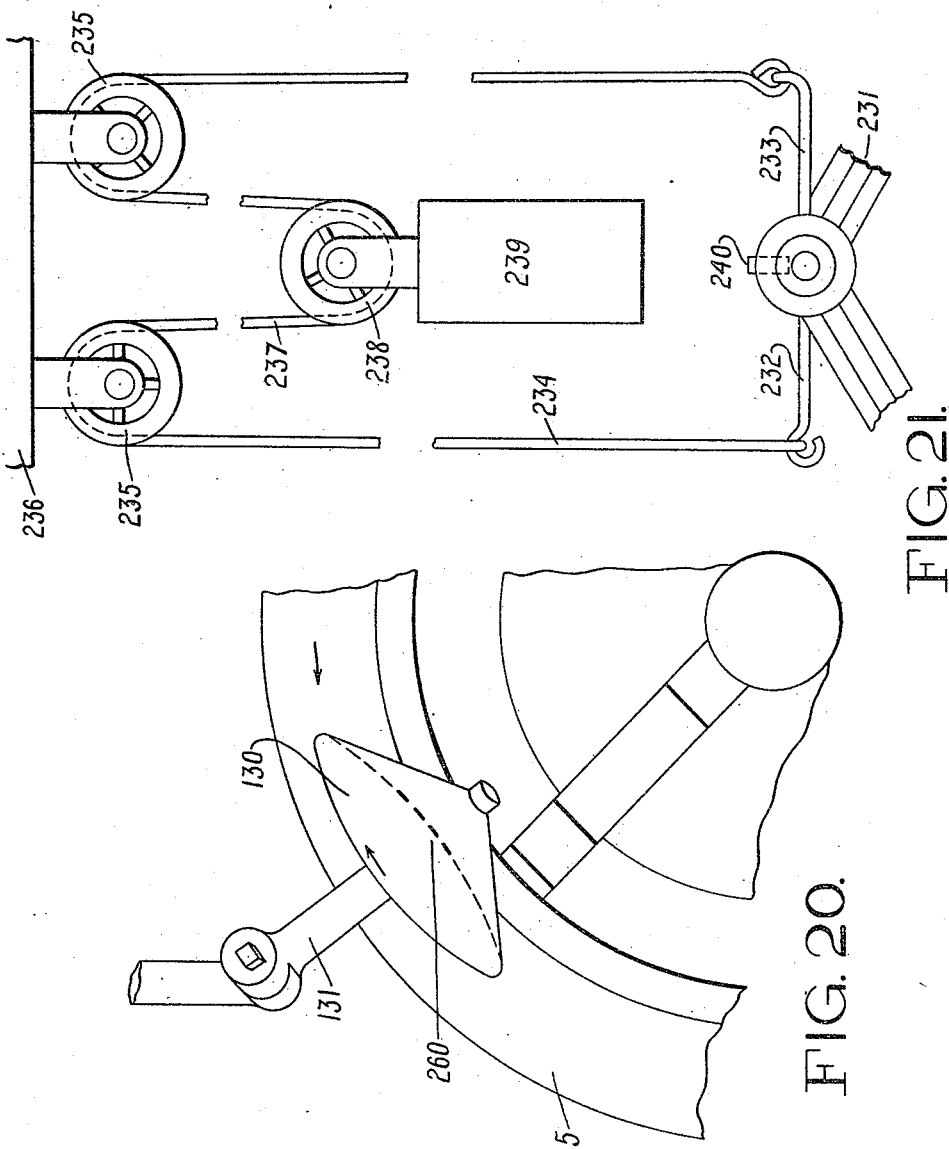

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF MAKING TIRES.

1,183,553. Specification of Letters Patent. Patented May 16, 1916.

Original application filed December 2, 1909, Serial No. 531,045. Divided and this application filed February 7, 1914. Serial No. 817,217.

*To all whom it may concern:*

Be it known that I, JOHN R. GAMMETER, a citizen of the United States, residing at Akron, county of Summit, and State of Ohio, have invented certain new and useful Improvements in Methods of Making Tires, of which the following is a specification.

My invention relates to the making of tires composed of fabric and rubber, and more particularly to the making of the outer casings or shoes of pneumatic tires. Tires of this nature, and particularly the larger sizes thereof, designed for use on heavy motor vehicles, commonly comprise a main body portion composed of a number of layers of fabric laid one upon another and held together by a suitable binder, usually of rubber gum with which the fabric is impregnated, beads secured to the inner edges of the body portion for securing the tire to the rim and an outer tread surface of soft rubber.

While tire-making machines have been used to some extent, it has heretofore been the general practice to build up these tires entirely by hand, laying upon a core or mold of the configuration desired for the interior of the tire, a certain number of layers of fabric, then securing bead rings to the sides of the tire followed by more fabric and finally to apply the rubber tread.

My machine is designed primarily to build up the fabric portion of the tire, applying the successive layers of fabric upon the core or form and smoothing them in place without the necessity of utilizing hand labor for this purpose.

My invention involves certain improvements in the method of making tires, as will more fully appear hereinafter.

This application is a division of my application Serial No. 531,045, filed December 2, 1909.

Figure 16:
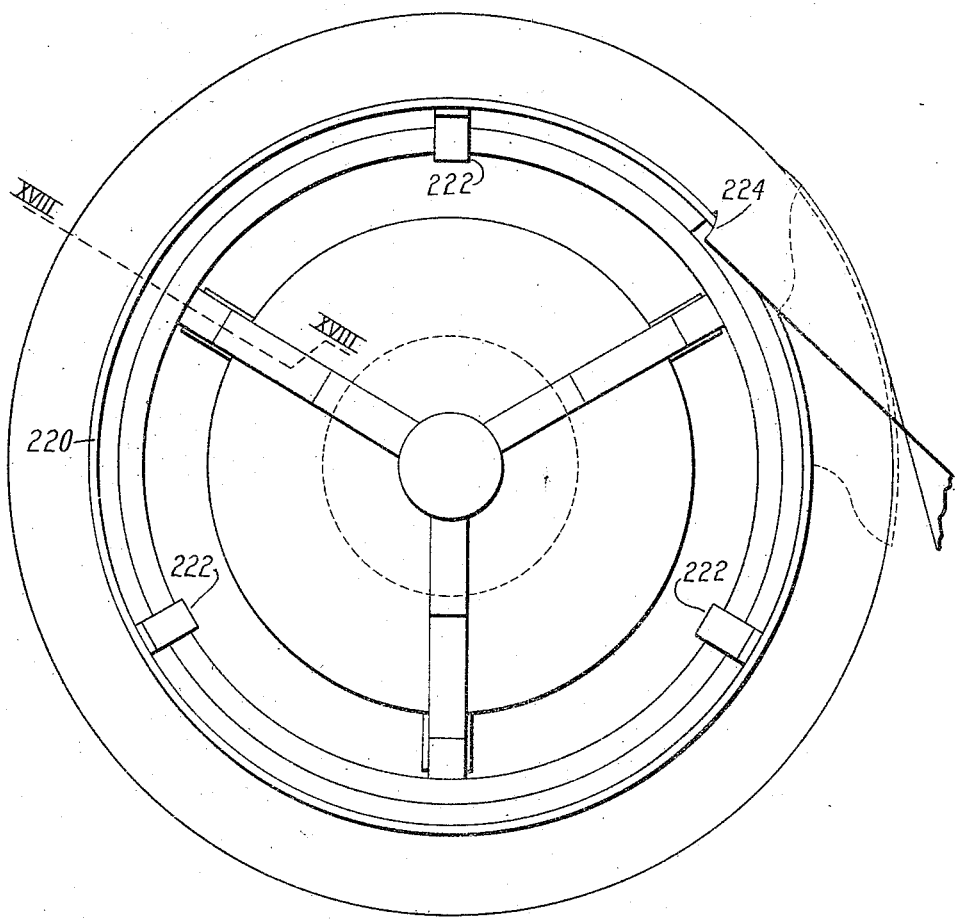
Figures 22, 23, 24, 25:
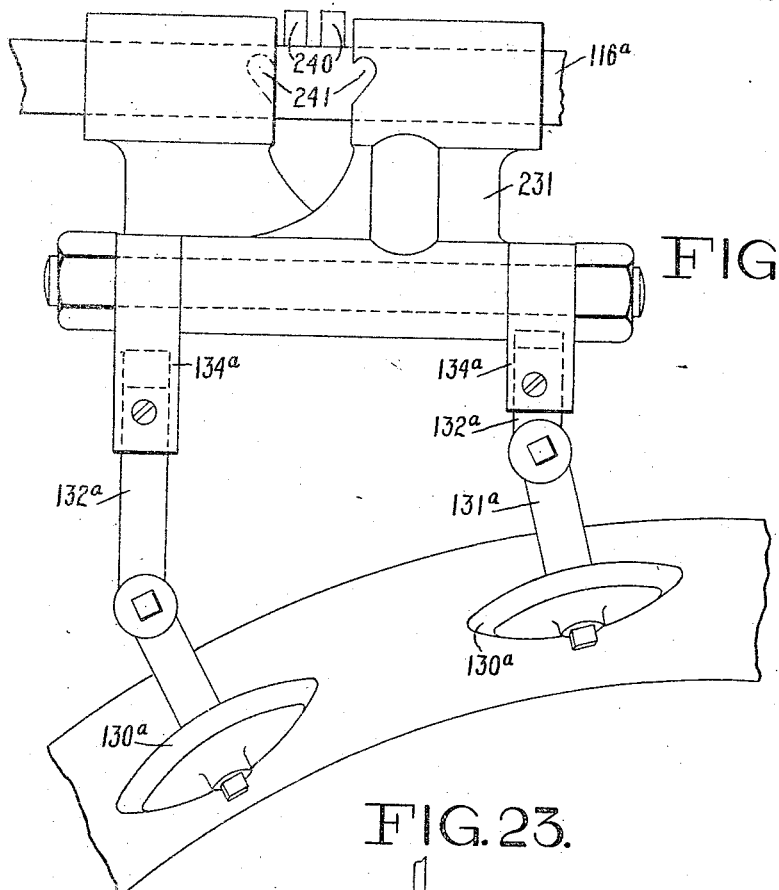

In the accompanying drawings which form a part of this specification, Figure 1 is a side elevation of a tire making machine embodying my invention; Fig. 2 is a detail view showing a portion of one of the core supporting arms with the core mounted thereon, and illustrating the operation of the trimming knife; Fig. 3 is an elevation of one of the rolls used for forming the fabric about the tire beads and of the box for carrying the same, a portion of the carrying-frame being shown in section; Fig. 4 is a similar view illustrating another of the rolls used; Fig. 5 is an end view of the machine, looking toward the right in Fig. 1; Fig. 6 is a detail view of the adjustable trimming knife, parts being shown in section; Figs. 7 and 8 are sections taken on lines VII—VII and VIII—VIII respectively of Fig. 6; Figs. 9, 10 and 11 are detail views partly in section, showing the construction of rolls for performing different operations during the manufacture of the tire; Fig. 12 is a transverse section, and Fig. 13 is a side elevation, parts being broken away, of the fabric shaping guide or stretcher; Fig. 14 is a fragmentary side elevation showing the fabric feeding rolls and driving mechanism thereof; Fig. 15 is an end view of the driving mechanism shown in Fig. 14; Fig. 16 is a side elevation showing the bead carrying ring applied to the core with a partially formed tire thereon; Fig. 17 is an elevation of one of the frames carrying the mechanism for laying the fabric over the bead, showing the side of the same nearest the tire; Fig. 18 is a section taken on line XVIII—XVIII of Fig. 16; Fig. 19 is a diagrammatic view showing the method of joining the ends of the strips of fabric for making two tires by means of a leader; Fig. 20 is a diagrammatic view showing one of the fabric laying disks and illustrating the manner of engagement of the disks with the partially formed tire; Fig. 21 is a diagrammatic view of an alternative arrangement for putting pressure on certain of the fabric laying rolls and disks; Fig. 22 is a detail side elevation showing a modification of my machine in which a pair of fabric laying disks is used; Figs. 23 and 24 are detail views in section and elevation respectively of a device for locking the disks or rolls in inoperative position; Fig. 25 is a sectional view of one of the disks shown in Fig. 22.

In these drawings, I have chosen for purposes of illustration a specific mode of carrying out my invention, which I have shown in detail and which I will describe in the following specification, but I do not wish to be limited to the exact mode of procedure set forth, as the principles of invention may be embodied in many different ways falling within the purview of my invention, and any suitable apparatus may be employed in performing it.

Referring to the drawings in detail, 1 is a bed-plate upon which is mounted a pair of uprights, 2 and 3, carrying the main shaft 4, the forward end of which projects in front of the uprights. Upon the overhanging end of this shaft I provide means for supporting the core or ring 5, about which the tire is to be formed. The means employed for this purpose preferably comprises a chuck 6, having three outwardly projecting arms 7, with V-shaped extremities 8, adapted to engage within a V-shaped groove 9, cut in the inner face of the inwardly projecting flange 10 of the core. The chuck may be of any usual or well known construction such as that of the chucks commonly used for holding work upon turning lathes, in which by use of a suitable key or wrench engaging a nut, such as 11, appropriate mechanism within the chuck may be operated to simultaneously force outwardly or contract all of the arms 7. By this means the proper centering of the core or ring 5, is insured. It is deemed unnecessary to illustrate the mechanism of this chuck in detail, as any of the well known constructions adapted to the purpose may be used.

For driving the shaft 4, and rotating the chuck and ring carried thereby, any suitable mechanism may be employed, preferably a worm gear 20 mounted on the rear end of shaft 4 and engaged by a worm 21, carried by a shaft 22. The latter is adapted to be driven from either of the pulleys 23 or 24, by belting from any suitable source of power. A clutch, 25, may be used for connecting the pulley 23 to the shaft 22, suitable levers or other connections (not shown) being provided for operating this clutch. 26 is a similar clutch for connecting pulley 24 to the shaft when desired. Two pulleys of different sizes are provided in order that the apparatus may be driven at different speeds, as will be obvious. Shaft 22 is preferably provided also with a hand wheel 27 by which it may be rotated to adjust the position of the ring as may be found necessary in starting or completing the formation of the tire. Fixed upon one end of the bed-plate 1 is a base 30 upon which is mounted an upright 31 provided with bearing recesses 32 and 33. The upright is preferably mounted to slide on the base 30 toward or from the tire carrying ring 5. A screw 34 operated by hand wheel 35 and working in a nut 36 carried by the upright, provides means for adjusting the position of the latter.

In the bearing 32 is mounted the shaft 37 of a reel 38 carrying a roll 38$^a$ of the fabric from which the body of the tire is to be formed, the gummed tire forming fabric being laid upon and rolled up with a strip of ungummed fabric or "liner" as it is called, which prevents the layers of gummed fabric from adhering. To prevent the too ready rotation of this reel, the shaft 37 is preferably provided with a brake disk 39 against which bears a brake shoe 40 mounted at one end of an arm 41 pivoted on a pin 42. On the other end of the arm 41 slides a weight 43, which may be secured in any desired position to produce the proper braking effect, by a set screw 44. In the upper bearing recess 33, which is preferably of considerable depth, is mounted a reel 45 which is driven through friction from the roll 38$^a$ and upon which is wound the ungummed strip or liner coming from the roll. As the roll 38$^a$ is unwound, the liner being taken up by the reel 45 will increase the diameter of the latter, the deep bearing recesses 33 permitting the shaft of the reel to rise correspondingly.

Also mounted on the upright 31 are a pair of longitudinally alined sleeves 50, one being carried by each of the side members of the upright and each projecting at each side of its side member to form a pair of cylindrical bosses. To the two bosses thus formed projecting from the inner sides of the side members of the upright 31 are secured a pair of upwardly extending arms 52. The arms 52 are secured to the bosses against rotation in any suitable manner, as by having their lower ends split and drawn together by clamping bolts 54. Rotatably mounted in these arms 52 is a roller 55; and journaled in the sleeves 50 is a shaft 56 to which is fixed a convex or bellied roller 57. On the bosses formed by the outwardly projecting portions of the sleeves 50, are pivoted a pair of depending arms 60, secured to the lower ends of which are boxes 61 carrying a shaft 62. To the shaft 62 is fixed a driving wheel 63, preferably provided with a rubber tire 64, or other suitable friction surface adapted to bear against the core or ring 5 or the fabric wound thereon and receive motion from the latter. Means are also provided for driving the shaft 56 and the bellied roller 57 from the shaft 62, these means being shown in this case as a pair of sprocket wheels 65 and 66, connected by a chain 67. Gears 68 and 69 are also preferably provided for driving the roller 55 from the shaft 56. It is obvious that any other suitable form of driving connections may be used in place of those described. For holding the wheel 63 in driving contact with the ring 5, or partially formed tire, I provide a frame 70 pivoted at one end to the shaft 62 and having projecting from the other end thereof a shaft 71, the free end of which slides in a box 72 pivoted between the arms of a forked lever 73 fixed to a shaft 74 journaled in the upright 31. To the projecting end of this shaft is secured a hand lever having a pawl 76 engaging with a fixed notched segment 77. A spring 78 is compressed between the box 72 and the hub of a hand wheel 79 screwing on a threaded portion of the shaft 71 and forces the frame and the driving wheel carried thereby forward, the tension of the spring being regulated by the position of the lever 75. The tension of the spring may also be adjusted by rotating the hand wheel 79.

Also supported on the shaft 62 are a pair of arms 80 having slots 81 in their outer ends. The rear ends of said arms are bent upwardly as shown at 92 and provided with slots 93 arranged concentrically with shaft 62. By means of bolts 94 passing through the slots 93, the arms may be secured to the frame 70 in desired angular position. Secured to these arms 80 are a pair of segmental bars 82. These bars are preferably pivoted to the arms by means of bolts 83 passing through the slots 81, whereby the position of the bars relatively to the arms may be adjusted. From the upper end of each of the arms 82 projects a radial standard 84 upon each of which is mounted a box 85. The boxes are slidably mounted upon these radially disposed standards, means such as set screws 86 being provided for securing them in desired position thereon. In the boxes 85 is journaled a transverse shaft 87 upon which is mounted a roller 88 adapted to bear upon the ring 5, or partially formed tire and support the free end of the bars 82. This roller 88 is preferably split as at 89, its two halves being urged together by springs 90. It is preferably formed of some yielding material such as soft rubber, in order that it may fit smoothly on the layers of fabric wound upon the core 5, and its extended flanges 91 closely embrace the sides of the partly formed tire.

Also supported by the bars 82 is the fabric shaping guide or shoe 100. This is preferably secured to the bars by means of bolts 101 passing through slots 102 therein, whereby a limited circumferential adjustment of the guide is permitted. The guide preferably consists of a single piece of metal shaped to conform closely to the outer surface of the core and tapering to a comparatively thin edge 103 at its upper end which is brought as close as possible to the surface of the core, or partially formed tire thereon. The outer surface of the guide is made smooth to permit the fabric to slide thereover. The fabric coming from the reel 38 and passing under reel 45, which takes up the liner, passes over rolls 55 and 57, slides over this guide and is cupped to the approximate shape of the tire section, being laid on the core by the roll 88. The fabric is, of course, treated in the usual manner with a suitable rubber compound and being in a sticky condition adheres closely to the core.

For forming the fabric to the undercut portion of the core, I provide means which will act upon the fabric as it leaves the roller 88. These means comprise a pair of rollers 110 preferably formed of soft rubber, or other yielding material, and journaled upon short shafts 111. Any suitable means may be used for carrying the shafts, which will permit the rolls to be drawn together when in action and readily thrown out of the way when a completed tire is to be removed, and a new core or ring inserted in the machine. For this purpose I have shown the shafts as bolted to sleeves 112 and 113. When the bolts are tightened, the shafts and sleeves will be held in rigid relation with each other, but by loosening the bolts the inclination of the shafts may be readily adjusted. The sleeves are slidably mounted upon arms 114, to which they are secured in desired position by screws 115. The arms are journaled on a shaft 116, supported from the uprights 2 and 3 in any suitable manner as in boxes 117, carried on the ends of shafts 118. For drawing the rollers 110 together any means for applying a constant and even pressure may be used, such as a contractile spring 119, which may be hooked over the extended ends 123 of bolts 120. When it is desired to separate the roller 110, it is merely necessary to unhook one end of the spring 119 and turn the arms 114 about the shaft 116 until the rollers are removed from proximity to the tire. The rollers are preferably so adjusted that when in operation their axes will be substantially parallel and will pass in front, that is, on the side from which the tire part to be acted upon advances, of the axis of rotation of the core. The rollers 110 are preferably of irregular profile having substantially cylindrical portions 121 adapted to engage with the side portions of the tire and be driven thereby, and the portions 122 of enlarged diameter adapted to engage the tire just beneath the broadest point thereof and stretch the fabric about the core. Owing to the larger diameter of these portions of the rolls, they will have a slightly greater peripheral speed than the portions 121, and a greater peripheral speed than the portions of the tire with which they engage. They will tend to pucker or push ahead the part of the fabric in contact with them and take care of the loose fabric caused by the curving of the strip about the core, there being less tension at this point, thus causing the fabric to conform more closely to the configuration of the core.

In order to form the edge portions of the fabric and to cause them to lie closely against the core or ring preparatory to application of the bead, I provide a pair of disks 130, arranged to act upon the tire after it has left the rollers 100. These disks, which are preferably cupped slightly, may be supported in any suitable manner, as, for instance, upon short shafts 131 carried by sleeves 132 and 133 which in turn are secured to arms 134 journaled on the shaft 116. The construction of these parts is preferably similar to that of the corresponding parts for carrying rollers 100, a coiled contractile spring 139, or other suitable means, being provided for drawing these arms together and pressing the disks 130 into contact with the tire. The shafts upon which the disks 130 are mounted are adjusted in such a manner that the disks will be inclined upward, that is, the shafts will diverge, as shown, the edges of the disks being thus brought into contact with the fabric on the undercut portion of the core through a considerable arc. The short shafts 131 are directed so that their axes will pass either directly through the axis of rotation of the core, or a slight distance above said axis, in order to shift the arcs of contact of the disk edges with the fabric slightly in advance of the axes of rotation of the disks. The disks as thus adjusted, while rotating by contact with the fabric exert a peculiar downward drag toward the center of the core, which causes the fabric to assume the configuration of the core and cling closely thereto. In Fig. 20 I have illustrated this diagrammatically, the dotted line 260 representing the line of contact between the disk edge and the side of the tire. These disks are used only while the layers of fabric applied prior to the application of the bead are being put on, being swung out of the way before the bead is applied, and remaining out of action during the construction of the remainder of the tire. The disks are cupped or hollowed out so as to provide working edges projecting or raised laterally from the disks. This provides for a clearance between the surface of the disk and the fabric and permits the working edge to operate freely and in the intended manner.

In the manufacture of tires of large sizes, I frequently find it desirable to use a plurality of disks 130ª upon each side of the tire, as illustrated in Fig. 22. These disks are not arranged to act upon the tire in the same circumferential line, but are arranged to take hold of successive portions of the fabric, the first disk 130ª acting to smooth the fabric part way around the cross section of the core, while the second disk 130ª acts further down upon the fabric and smooths the same about the remainder of the core section. These disks 130ª are preferably mounted on short shafts 131ª, bolted to arms 132ª, telescoping in sleeves 134ª. These sleeves are secured to the ends of the short shafts 230, carried by bracket 231, pivotally and slidably mounted upon the shaft 116ª supported by the main frame. The brackets 231 and the disks supported thereby are urged toward each other and the disks are held in contact with the sides of the tire by means of arms 232 and 233, one secured to each of the brackets 231. A cord (see Fig. 21) 234, has one end secured to each of these arms and passes over sheaves 235, supported by some fixed part 236 of the machine or building. A loop 237 is formed in the cord between the two fixed sheaves in which hangs a sheave 238 carrying a weight 239. By this means a uniform force will be applied to the disks upon the two sides of the tire. It will be obvious that this cord and weight mechanism may be used in forcing together the arms carrying the single disks shown in Fig. 1, or the arms carrying the rollers 110, instead of the spring arrangement which has been described, also that springs may be used for drawing together the brackets 231, in place of the cord and weight mechanism, if desired.

For supporting the brackets 231 in raised, or inoperative position, I preferably provide in the shaft 116ª a plurality of pins 240, one for each of the brackets 231, inclined notches 241 being formed in the brackets for engagement with these pins. To engage the notch with the pin, it is simply necessary to raise the bracket 231, thus forcing down its arm 232 or 233 as the case may be, and raising the weight 239 slightly, and then slide the bracket longitudinally on the shaft 116ª toward the pin 240 until the notch 241 engages the same, when the bracket 231 will be locked in raised position. This locking mechanism may obviously be applied, if desired, to the roll and disk bearing arms shown in Fig. 1.

After the desired number of layers of fabric have been applied to the tire for forming the foundation of the same prior to the application of the beads, the machine is stopped and the rolls and disks having been moved to inoperative position as described, the beads are applied. For applying these beads, which are usually rings formed of fabric impregnated with a rubber compound in a plastic or semi-plastic condition, I provide a pair of carrying rings 220 having annular recesses 221, shaped to the configuration of the outer side of the beads. I also provide means for centering these rings with relation to the core, such as the three arms 222, secured to the ring 220 and adapted to fit within the inner circumference of the core. The beads 223 are placed in the recesses 221 in the rings 220 and the arms 222 being inserted within the inner circumference of the core, the beads 223 are forced into contact with the sides of the partly formed tire, to which they will adhere. The rings 220 can then be readily removed, leaving the beads accurately located upon the sides of the tire. The tire is now ready for the application of the remaining layers of fabric. The invention in bead-placing rings described above is claimed in a divisional application filed February 2, 1911, Serial No. 606,090.

In order to conform the fabric to the outline of the bead and roll the same smoothly thereover, I pass the tire first between a pair of rolls 140 mounted on short shafts 141, carried in boxes 142, bolted or otherwise suitably secured to frames 150. These rolls 140 are preferably of metal and have smooth faces shaped to roll the fabric into the grooves above the tire beads. The tilting frames 150 are slidably mounted upon a shaft 151, which in turn is carried in an upright 152, mounted upon a base 153, secured to the bed-plate 1. Suitable means for adjusting the position of this upright upon the base, such as a screw 154, carried by the base and operating in a nut 155 carried by the upright, are preferably provided. 156 is a hand wheel for rotating screw 154. A spring 157 acts to force the frames 150 and consequently the rolls carried thereby toward each other and holds the rolls in contact with the tire. This spring acts on the lower arms of bell crank levers 158 which are pivoted to the upright 152 at 159, the upper arms of said bell crank levers being bifurcated as shown at 160, and having trunnions 161 engaging in suitable grooves 162 in bosses 163 projecting from the frames 150. To withdraw the rolls carried by the frames 150 from contact with the tire, in order that the frames and rolls may be moved to inoperative position, I provide the bell cranks 158 with hand levers 164. When the frames 150 are swung into operative position as shown in full lines in Fig. 1, they are supported by a cross-piece 165 secured to the upright 152. A similar cross-piece 166 is provided upon the other side of the upright 152 to support the frames 150 when moved to the inoperative position shown in dotted lines in Fig. 1. The frames are preferably provided with set screws 167 and 168 for engagement with supports 165 and 166 respectively, the screws 167 providing means for adjusting the elevation of the frames and of the rolls carried thereby when the frames are swung to operative position.

Also supported by the tilting frames 150 are boxes 170 carrying shafts 171. The boxes are preferably secured to the frames by means of studs 172 passing through slots 173 in the frames 150, whereby the positions of the boxes 170 may be adjusted. Fixed to each shaft 171, are a driving roll 174 provided with a tire 175, of soft rubber or other friction material, and a pucker roll 176 provided with a soft rubber tire 177 shaped to engage the edge of the fabric to form the same to the outer edge of and beneath the tire bead. Loosely mounted upon the shaft 171 between the rolls 174 and 176 is an idle roll 178, preferably having a smooth metal surface, which follows the groove formed above the tire bead and forces and holds the fabric firmly in its position therein. The roll 176 while being secured to the shaft 171 against rotation as by key 179, is free to move longitudinally with relation thereto and is constantly urged radially outward with respect to the axis of rotation of the core by means of spring 179$^a$. The flange of the roll is thus held firmly against the inner circumference of the bead and presses the fabric in contact therewith. The diameter of roll 176 being greater than that of roll 174, which drives it, the roll 176 will have a greater peripheral speed than that of the portion of the tire fabric with which it engages. The roll will thus have a tendency constantly to force the fabric ahead and smooth out or prevent any wrinkles caused by the action of rolls 140 and 178 in forcing the fabric into the groove above the bead.

Secured also to each frame 150 is a box 185 carrying a shaft 180 upon which is mounted a split roll comprising an inner part 181 with a deep flange 182 adapted to engage beneath the tire bead and smooth down the fabric forming the base of the tire, and an outer part 183 adapted to engage the outer side of the bead. Springs 184 force these roll parts together and into contact with the bead, at the same time permitting the roll parts to spread to accommodate the increasing size of the bead as the successive plies of fabric are applied to it. Each frame 150 carries also a knife mechanism for trimming off the superfluous edges of the fabric. Any suitable construction may be used for this purpose, such, for instance, as that shown in Figs. 6, 7 and 8, in which a blade 190 is slidably mounted in a grooved guide or holder 191. The holder is mounted in a slot 192 in the frame, being held in adjusted position therein by means of a pair of clamping collars 193 engaging screw threaded portions of the holder. Set screws 194 are preferably provided for locking the collars 193 in position. The inner end of the holder is cylindrical as at 195, while the part 196, which is located within the slot 192, is flat-sided or rectangular. The knife blade 190 is moved in and out through slot 197 in the holder, by means of a hand nut 198 internally threaded and engaging with teeth 199 cut in one edge of the shank of the blade. The outer portion 200 of the holder is turned eccentrically to a smaller diameter to receive this nut and is provided with a collar 201 secured in place by a set screw 202 for retaining the hand nut in position. The slots 192 being radially arranged with reference to the axis of rotation of the core, the positions of the knives may be adjusted laterally to admit the trimming of tires of different sizes.

The operation of my device is as follows: The frames 150 having been swung to inoperative position, and arms 114 and 134 carrying their rollers having been moved out of the way, a core or ring is inserted in the machine and secured to the chuck. As the arms of the latter always move toward and from the center of rotation of the chuck equally, the centering of the ring is assured. The split roller 88 now rests on the outer surface of the ring or core and supports the outer ends of the bars 82 and the guide or shoe 100 in proper position relatively thereto, the forward edge of the guide lying in close proximity to the outer surface of the ring. The driving wheel 63 is held in driving engagement with the ring by the pressure of spring 78, the tension of which is regulated by the hand lever 75. A reel 38, bearing a roll of fabric 38ª is now placed in the bearing recesses 32. This roll of fabric preferably comprises a series of strips of gummed bias fabric 250, each of a length just long enough to make one tire, these strips being joined by leaders 251. The latter are preferably also formed of bias fabric of similar texture to the fabric used for forming the tires and are impregnated with rubber and vulcanized. The band of strips of gummed fabric and leaders thus formed is rolled up with a strip of ungummed fabric or liner, as already described. A leader 251 is secured to the free end of the first strip of gummed fabric. In starting the tire this leader is carried over the roll 55, the convex or bellied roll 57, and the guide shoe 100, the end of it being applied to the ring or core 5 to which it is secured by a suitable cement or otherwise. The end of the liner is rolled about the reel 45. The arms 114 and 134 are now swung to bring the respective rolls and disks carried thereby into operative position, in which they are held by their springs 119 and 139 respectively. Power is now applied to shaft 22, which through the worm 21 and worm wheel 20 rotates the ring in the direction indicated by the arrow in Fig. 1. The driving wheel 63 will now begin to rotate and will, through the chain 67 and gearing 68 and 69, positively drive the rolls 55 and 57. The diameters of the driving wheel 63 and roll 57 and of the sprockets 65 and 66 are so proportioned that the peripheral speed of the central portion or crown of the roll 57 is somewhat less than that of the outside of the core or ring, usually about 15 per cent. less. The peripheral speed of the roll 55 is, however, preferably about equal to that of the crown of the roll 57, although I may make it slightly less, if desired. The roll 55 is usually provided with a roughened surface, as by covering it with cloth, or rubber, in order to prevent slipping between its surface and the fabric passing over it, whereby it will be caused to feed the fabric uniformly to the roll 57. It will be noted that the fabric passing between the feeding roll 57 and the core or partially completed tire thereon will pass along a plane substantially tangent to the surface of the core and that of the roll. Between the roll 57 and the core, the fabric will be stretched, owing to the smaller peripheral speed of the former. The stretching will be greatest in the middle of the strip of the fabric as the peripheral speed of the inner portions of the core to which the edges of the fabric are to be applied is less than that of the outer circumference of the core and usually no greater than that of the roll 57. The leader 251 is used in order to equalize the stretch in the strip of tire forming fabric and produce the same condition in it at the starting and completing of the tire as exists during the remainder of the formation thereof. After the core has been rotated to such an extent that the end of the gummed fabric has been drawn into contact therewith by the leader and has become firmly attached thereto, the leader, which is of such a length as to extend but a part of the way around the core, is removed. The rotation of the core is then continued, and the winding up and laying of the gummed tire forming fabric is begun. As the result of the difference between the rate with which the fabric is fed over the rolls 55 and 57 and the rate at which it is taken up by the rotating core, the fabric must stretch between the roll 57 and the core. During this stretching operation the fabric is dragged over the guide or shoe 100 which gives a much more pronounced stretch to the middle portions of the fabric strip than to the edges of the latter, thus causing the fabric naturally to assume the cup shape which it must occupy when a part of the tire. By properly designing the outline of the guide 100 and the shape of its forward edge 103, over which the fabric slides to the tire, the relative stretch of the different parts of the fabric can be determined to a nicety. The circumferential adjustment of the guide in the slots 102 also affects the relative stretch of the different parts of the fabric, the stretch in the middle of the fabric being greatest when the guide is in its most advanced position. This guide or shoe 100 has the very important function of supporting the strip of fabric out of contact with the core or partially formed tire thereon while the stretching operation is taking place, thus permitting the different parts of the fabric to adjust themselves under the varying tensions to which they are subjected and to assume the cupped shape which the fabric is to occupy when incorporated in the tire, before the fabric slides upon the core or tire and adheres thereto. If the fabric were permitted to pass directly from the roll 57 to the rotating core it would become attached to the latter, or to the partially formed tire thereon, before it has an opportunity to be completely stretched or to assume its final configuration, the result being, that when rolled down upon the sides of the core it would not lie flat, but would tend to wrinkle and would be subjected to uneven tensions in the completed tire. This feature of my invention I regard as of great value, although in certain cases, particularly in making tires of small sizes, it may be dispensed with. The fabric is now so formed that it will lie closely to the outer portions of the ring and as the latter continues to revolve the fabric will pass under the split roll 88, which smooths it down over the top half of the ring section. The rolls 110 come next into action, shaping the fabric to the undercut portion of the ring section, as already described. The action of these rolls is followed by that of the disks 130 which complete the operation of shaping and rolling the fabric to the sides of the ring and causing it to adhere thereto throughout its section.

The revolution of the ring is continued after the first layer has been applied, the second thickness being laid over the first, and so on, until the desired number of layers prior to the application of the beads have been put on. As will be seen, the roller 88 will be lifted slightly by the successive layers of fabric, carrying with it bars 82 and the guide 100, which will thus always just clear the layer of fabric immediately beneath it. It will also be seen that as the rolls 55 and 57 are driven from the driving wheel 63, which takes its motion from the outer surface of the tire so far as built up, the ratio of the peripheral speed of the outer surface of the partially formed tire to that of the roll 57 will remain constant regardless of the increasing diameter of the former. If this were not the case the peripheral speed of the tire as the additional layers were put on and its diameter increased, would correspondingly increase, and supposing the peripheral speed of the roll 57 to remain constant, the successive layers of fabric would be subject to a gradually increasing stretch. The result would be the production of a tire, the outer layers of which were under greater tension than the inner, and thus compelled to take an excessive proportion of the stress. This excess tension in the outer layers of course is not great and its existence would not constitute a vital defect, but I regard it as an advantage to have all layers under the same tension.

When a sufficient amount of fabric has been wound upon the core or ring, the machine is stopped, arms 134 and the disks carried thereby swung to inoperative position, and if necessary, arms 114 and rolls 110 also, and the previously prepared beads 223 applied to the sides of the partially formed tire. As the latter is sticky and the beads also are usually covered or impregnated with rubber compound, they will adhere to the tire in their proper location. It is unnecessary to completely sever the strip of fabric when applying the beads, as they may be fitted to the part of the tire already formed by simply notching the edges of the fabric strip as indicated at 224. The hand levers 164 are now drawn out, the frames 150 swung to operative position as shown in full lines in Fig. 1, and the hand levers released, permitting the spring 157 to force the frames toward each other. This brings the rolls 140, carried by the shafts 141, the rolls 174, 176 and 178 carried by the shafts 171 and the split rolls 181 and 183 into contact with their several respective parts of the tire and beads as above described. The knife blades 190 have previously been withdrawn to inoperative position as will be understood. The machine is again started, the guide 100 and rolls 88 and 110 continuing their normal action. The fabric is now laid over the bead, its edges hanging more or less loosely over the latter until the rolls 140 are reached. These rolls force the fabric into the grooves above the tire beads as indicated in Fig. 4. The rolls carried by the shafts 171 next come into action, rolls 174 owing to their adhesion to the tire driving their respective shafts and through the latter the pucker rolls 176, the action of which is to force the edges of the fabric against and under the tire beads, and at the same time push the fabric ahead and prevent its wrinkling under the action of the loose rolls 178 which carry on the action started by the rolls 140 of forcing the fabric into the groove above the beads. The split roll 181—183 next takes up the operation, the roll part 183 holding the fabric closely to the outer portion of the bead where it has already been laid, and the inner roll portion 181, with its deep flange 182 turning the fabric under the bead and forcing it closely thereagainst to form the foot of the tire. The springs 184 serve to keep these roll parts in contact with their work, at the same time permitting them to spread as the thickness of the bead increases due to the addition of the successive plies of fabric. Allowance is also made for the increasing size of the tire by means of the spreading apart of the frames 150 which are yieldably held together by the pressure of spring 157. This operation is continued until a sufficient number of layers of fabric have been applied to form the completed body portion of the tire when the band of fabric coming from the roll is severed. If the strips of fabric forming the roll 38 have been measured off with sufficient exactness, the junction between the end of a strip and one of the leaders 251 will now have been reached and this severing will merely consist in detaching the end of the leader from the end of the strip of fabric. If too long a strip of fabric has been used, the strip will be actually severed at this point and the surplus length detached from the leader. The roll of fabric is thus left in condition for the immediate starting of another tire, the leader being ready for application to a new core, which can be put in the machine as soon as the old core with the tire thereon is removed. After the fabric strip has been parted, knives 190 are forced into contact with the ring or core, cutting through the superfluous inner edges of the fabric, and the ring and tire rotated, preferably at high speed, to trim off these edges throughout the entire circumference. The tire is now ready for the application of the soft rubber tread surface which may be applied thereto in any suitable manner, either before or after its removal from the machine. After this tread surface is applied the tire is ready for vulcanizing, which is preferably accomplished by placing it while still on the ring 5 in a suitable mold and subjecting it to heat in any usual or well known manner.

Having thus described my invention, I claim:

1. The improvement in the art of manufacturing tires composed wholly or in part of fabric, consisting in shaping the fabric to substantially the configuration it is to occupy in the completed tire, and then while so shaped incorporating said fabric into the tire.

2. The improvement in the art of manufacturing tires composed wholly or in part of fabric, consisting in first stretching the strip with a longitudinal tension of unequal strength throughout its width, then curving the fabric transversely in the same direction in which the fabric will be curved when incorporated into the tire, and then incorporating the fabric while so curved into a tire.

3. The improvement in the art of manufacturing tires composed wholly or in part of fabric, consisting in first preparing a strip of bias fabric; second, stretching said fabric longitudinally; third, shaping said fabric to substantially the configuration of a tire, and fourth, forming said fabric while so shaped into the tire.

4. The improvement in the art of manufacturing tires composed wholly or in part of fabric, consisting in subjecting the fabric to a longitudinal tension of unequal strength throughout the width of the same, causing the fabric under tension to assume approximately the shape it is to hold when incorporated in the tire, and then incorporating said fabric in the tire.

5. The improvement in the art of manufacturing tires composed wholly or in part of fabric consisting in causing the fabric to assume the shape of a tire having under-cut portions, and incorporating the fabric so shaped directly into a tire.

6. The improvement in the art of manufacturing tires composed wholly or in part of fabric consisting in cupping the fabric, bending the edges thereof inwardly to form the under-cut portions of a tire, and incorporating the formed fabric directly into a tire.

7. The improvement in the art of manufacturing tires composed wholly or in part of fabric consisting in stretching the fabric unequally as to the middle and edge portions thereof, shaping the fabric to substantially the form it is to occupy in the completed tire, and incorporating the so-shaped fabric into a tire without substantially changing the configuration assumed by it during the shaping process.

8. The improvement in the art of manufacturing tires composed wholly or in part of fabric consisting in providing a greater longitudinal stretch to the middle portion of the fabric than to the edges thereof, shaping the fabric to substantially the form it is to occupy in the completed tire, and incorporating the so-shaped fabric into the tire without changing substantially the configuration assumed by it during the shaping process.

9. The improvement in the art of manufacturing tires composed wholly or in part of fabric consisting in feeding fabric from a feeding device to a forming device, and intermediate these devices stretching and shaping the fabric by cupping it while urging its edges inwardly to form the under cut portions of the tire.

JOHN R. GAMMETER.

Witnesses:
R. M. PIERSON,
WALTER K. MEANS.